United States Patent Office 3,803,191
Patented Apr. 9, 1974

3,803,191
ACICULAR SALTS AND THEIR PREPARATION
John E. Ehrreich, Wayland, and Adrian R. Reti, Cambridge, Mass., assignors to Graham Magnetics, Inc., Graham, Tex.
No Drawing. Filed Mar. 24, 1971, Ser. No. 127,513
Int. Cl. C07f 15/02, 15/06
U.S. Cl. 260—439 R
2 Claims

ABSTRACT OF THE DISCLOSURE

Acicular salts are formed using a two-step precipitation process. A first compound is precipitated which has the requisite particle size but not the desired acicular shape. Then this first precipitate is reacted to precipitate an acicular crystalline salt that can subsequently be treated to provide acicular metal particles.

BACKGROUND OF THE INVENTION

This invention relates to acicular salts and the preparation thereof. More specifically, it relates to very fine salt precipitates that can be used to prepare hyperfine acicular metallic particles.

Acicularity is sometimes a very desirable feature of hyperfine metallic particles. For example, when the particles are magnetic and are to be incorporated in a binder to make magnetic recording tape or a "plastic" magnet, the acicularity provides superior magnetic characteristics in the end product. Moreover, in any case where a plastic is to be loaded with a metallic filler, the physical characteristics of the filled material are generally better with an acicular filler than with the generally spherical shape characteristics of most hyperfine metallic particles.

Prior to the present invention, acicularity of hyperfine particles has generally been limited to materials that naturally tend to form acicularly when prepared by first precipitating insoluble salts from soluble ones and then reducing the metals from the insoluble salts. Iron oxide $Fe_2O_3$ is a singular example of this attribute in magnetic applications. Moreover, by its nature, this process makes it difficult to control particle size, since the salt particles tend to undergo crystalline growth in the saturated solutions from which they are derived.

SUMMARY OF THE INVENTION

In accordance with the present invention, we form acicular salts of uniform size and shape by using a double precipitation process in which we first precipitate a compound having the requisite particle size, but not the desired acicular shape. This first precipitate is then reacted to precipitate an acicular crystalline salt that can subsequently be treated to provide acicular metal particles.

The first precipitate is preferably highly insoluble and therefore it has an insignificant concentration in solution. The second precipitate is also highly insoluble. Consequently, there is little or no material to support crystal growth of the second precipitate. Further, since the crystals thus grow very slowly, the size of the latter can therefore be controlled within desirable limits.

More specifically, acicular cobalt oxalate crystals of a suitable size can be prepared by first adding sodium hydroxide to an aqueous cobalt chloride solution to precipitate cobalt hydroxide. This reaction proceeds to completion very rapidly and this, combined with the highly insoluble nature of the hydroxide, results in a suspension of hyperfine hydroxide particles of fairly uniform size.

Next, oxalic acid is added to precipitate cobalt oxalate from the hydroxide, with the very low solubility of the hydroxide and the oxalate contributing to the small size of the resulting oxalate particles as noted above. In the case of cobalt oxalate, this permits controlled acicular crystal growth and, specifically, it permits size control within desirable limits, e.g. about 0.06 to 2 microns in diameter, with lengths of 0.3 to 6 microns and a length to diameter ratio of at least 2 to 1.

More particularly a finely-divided, cobalt-containing suspension such as the hydroxide or the carbonate is prepared by mixing an aqueous solution of sodium hydroxide or sodium carbonate with an aqueous solution of a cobalt salt, such as cobalt chloride. Then, oxalic acid is reacted with the suspension to form cobalt oxalate. In practice, relatively low precipitation temperatures, e.g. 20° C., should be used because this tends to provide sufficiently small particle size. Also, each mixture is vigorously agitated to minimize agglomeration of the precipitate.

We do not fully understand why this process readily provides the desired oxalate size and shape. However, it appears that the parent hydroxide (or carbonate) particles serve not only as sources of the cobalt ions, but also as nucleating sites for the oxalate crystals. Secondary, with the very dilute solution resulting from low solubility, crystal growth is probably limited by a boundary layer each crystal and, especially in a vigorously agitated suspension, the boundary layer is thinner at the ends than the sides of these particles, thereby promoting acicular growth. Furthermore, the parent particles serve as reservoirs to replace the cobalt ions that are taken up by the oxalate crystals.

In this fashion, the process provides the desired low concentration without requiring an unduly large volume of solution to provide a reasonably large yield of the organic cobalt salt. Also important is the fact the hydroxide particles are used up in the process. These "disappearing" sites thus leave no impurities in the final material.

Moreover, in the nature of things, the acicular cobalt oxalate crystals provide an acicular shape for the cobalt particles reduced therefrom. Finally, the oxalate has a relatively low molecular weight, that is, the organic radical does not take up as much of the volume as would high molecular weight materials. In the ensuing reduction of the cobalt, this aids in providing compact particles with minimum shrinkage.

The size and shape of the oxalate crystals formed in accordance with this invention can be controlled by controlling the low solubility of the oxalate by introducing water souble organic solvents into an aqueous solution. This may be accomplished by carrying out the second precipitation in a water-alcohol solution having a specified water alcohol ratio. Excellent results have been obtained with 50-50 solutions and with solutions composed of up to 90% alcohol. For reasons not entirely understood, some water is apparently needed in the reaction. However, it appears that the solutions must be somewhat soluble to encourage particle growth. Good results have also been obtained by precipitating the oxalate in water and acetone.

Preferably, we use low precipitation temperatures, e.g. 20° C. and we subject the suspensions to intensive agitation during the reactions to help prevent undesirable crystal growth and to prevent agglomeration of the suspended particles.

In the case of cobalt or cobalt-iron, an acicular oxalate can also be precipitated from the carbonate which is also highly insoluble in water.

The primary use of the acicular salts formed in the foregoing manner is as an intermediate in the preparation of acicular metallic particles. That is, the salt crystals are subjected to a reducing atmosphere at an elevated temperature. The constituents react and decompose to gaseous products, leaving the metallic atoms which combine in the general acicular shape of their parent crystals.

In our copending application, Ser. No. 127,851 entitled Process for Enhancing Magnetic Properties of Metal Powders, filed on the same day as this application, we describe a preferred reduction process in which the salt particles are first coated with a polymer which prevents interparticle sintering at the reduction temperatures, again to maintain the desired particle size and shape. The polymer is largely removed by evaporation, sublimation, decomposition and/or subsequent washing.

For cobalt, cobalt-iron and iron, we prefer the oxalates over other salts because of their insolubility and acicularity, as noted above, and also because of their relatively low molecular weight as compared with other organic salts. That is, the organic radical does not take up as much of the volume as would higher molecular weight materials. In the ensuing reduction, then, this aids in providing compact particles with minimum shrinkage.

Organic salts are preferred to inorganic ones because the radicals are easily decomposed and removed during reduction of the cobalt.

In the case of cobalt oxalate, length-to-diameter ratios of the order of 10-to-1 have been obtained. On the other hand, with iron oxalate and iron-cobalt oxalate, the length-to-diameter ratios are of the order of 3-to-1. The particles are further characterized by being very small, e.g. as low as 0.06 micron in diameter.

SPECIFIC DESCRIPTION

The invention is further illustrated by the following examples:

Example 1

A quantity of 10 g. sodium hydroxide is used to form 100 ml. of an aqueous caustic solution.

A second aqueous solution is prepared containing 23.8 g. of $CoCl_2$ per 100 ml.

The first solution is mixed with the second solution using a magnetic stirring bar. After three minutes of mixing, 150 ml. of a 1 M solution of oxalic acid is added and the resultant mixture is agitated for five additional minutes before being filtered through a Buchner funnel. The filter cake, an acicular cobalt oxalate material, is washed five times with 100 ml. of water, finally washed with 100 ml. of acetone, and then air dried at about 30° C.

The resulting material is characterized by an average particle size of about 1 micron in width and about 3 microns in length.

Example 2

A quantity of 23.8 g. of $CoCl_2 \cdot 6H_2O$ is dissolved in a mixture of 90 ml. denatured ethyl alcohol and 10 ml. water.

A second solution is formed by dissolving 8.0 g. sodium hydroxide in a separate but equal quantity of the same alcohol-water solvent used to dissolve the $CoCl_2 \cdot 6H_2O$.

A third solution is formed by dissolving 13.5 g. of oxalic acid in a solvent mixture consisting of 135 ml. of denatured alcohol and 15 ml. of water.

The first two solutions are mixed together in a beaker for five minutes; thereupon the third solution is added to the mixture. After five minutes of further agitation, the entire mixture is filtered through a Buchner funnel. The filter cake is throughly washed with acetone and air dried.

The resultant filter cake consists of cobalt oxalate particles which are, on the average, about 0.1 micron wide by 1.0 microns long.

Example 3

The procedure of Example 2 is followed again except that a 50–50 volumetric mixture of alcohol and water is substituted for the mixtures used as solvents for dissolving the $CoCl_2 \cdot 6H_2O$, the sodium hydroxide, and the oxalic acid.

The resulting particles have an average particle size of about 0.35 micron wide by 2.5 microns long.

Example 4

Three solutions are prepared as follows:

| Solution | Solute | Solvent |
|---|---|---|
| A | 23.8 g. $CoCl_2 \cdot 6H_2O$ | 100 ml. water. |
| B | 12.4 g. $Na_2CO_3 \cdot H_2O$ | Do. |
| C | 13.5 g. oxalic acid | 50 ml. water. |

Solutions A and B are mixed together for five minutes in a beaker using a magnetic stirring bar. Then Solution C is added to the mixture and agitation is continued for another five minutes before the resulting material is collected on a filter, washed as described in Example 1, and air dried.

The resulting material is an acicular cobalt oxalate powder characterized by a very small particle size.

Example 5

Three solutions are prepared as follows:

| Solution | Solute | Solvent |
|---|---|---|
| A | 12 g. $CoCl_2 \cdot 6H_2O$ and 10 g. $FeCl_2 \cdot 4H_2O$. | Mixture of 50 ml. denatured ethyl alcohol and 50 ml. water. |
| B | 8 g. NaOH | Same as for Solution A. |
| C | 13.5 g. oxalic acid | Mixture of 75 ml. denatured ethyl alcohol and 75 ml. of water. |

Solutions A and B are mixed together. This mixture is agitated for five minutes before Solution C is added. After another five minutes of agitating, the material is filtered, washed with acetone and air dried.

Small acicular particles of cobalt oxalate are recovered.

Example 6

Three solutions are prepared as follows:

| Solution | Solute | Solvent |
|---|---|---|
| A | 19.9 g. $FeCl_2 \cdot 4H_2O$ | A mixture of 50 ml. denatured ethyl alcohol and 50 ml. water. |
| B | 8.0 g. NaOH | Same as for Solution A. |
| C | 13.5 g. oxalic acid | A mixture of 75 ml. denatured ethyl alcohol and 75 ml. of water. |

Solutions A and B are mixed together for two minutes; then Solution C is added and agitation is continued for another two minutes. The resulting slurry is filtered, washed with acetone and air dried at about 30° C.

The resulting precipitate is a very fine acicular iron powder.

Example 7

Three solutions are prepared as follows:

| Solution | Solute | Solvent |
|---|---|---|
| A | 29.1 g. of $Co(NO_3)_2 \cdot 6H_2O$ | 50 ml. denatured ethyl alcohol and 50 ml. water. |
| B | 8.0 g. NaOH | Same as for Solution A. |
| C | 13.5 g. oxalic acid | 75 ml. of denatured ethyl alcohol and 75 ml. of water. |

Solutions A and B are mixed together for two minutes; then Solution C is added and agitation is continued for another two minutes. The resulting slurry is filtered, washed with acetone and air dried at about 30° C.

The resulting precipitate is a very fine acicular cobalt powder.

Example 8

The following solutions are prepared:

| Solution | Solute | Solvent |
|---|---|---|
| A | 28.1 g. $CoSO_4 \cdot 7H_2O$ | Mixture of 90 ml. water and 10 ml. denatured ethyl alcohol. |
| B | 8 g. NaOH | Same as for Solution A. |
| C | 13.5 g. oxalic acid | Mixture of 75 ml. water and 75 ml. denatured ethyl alcohol. |

Solutions A and B are mixed together for three minutes during which time a cobalt hydroxide precipitate formed in the mixture. Then Solution C is added and mixing is continued for three minutes after the addition. The resulting product, an acicular cobalt oxalate, is recovered by filtration, two washes with 100 ml. portions of acetone, redispersal in 100 ml. acetone, refiltration, and an air-drying step.

Example 9

| Solution | Solute | Solvent |
|---|---|---|
| A | 23.8 g. $CoCl_2 \cdot 6H_2O$ | Mixture of 50 ml. water and 50 ml. acetone. |
| B | 8 g. NaOH | Mixture of 100 ml. water. |
| C | 13.5 g. oxalic acid | 100 ml. $H_2O$. |

Solutions A and B are mixed together and agitated for three minutes using a magnetic stirring bar. Thereupon Solution C is added to the mixture, agitation is continued for another three minutes, and the resulting precipitate is recovered by filtration. The filter cake is first washed with a mix containing 50 ml. acetone and 100 ml. water, then washed twice again with 100 ml. of acetone. Finally the washed material is reslurried in acetone, filtered and air dried at 30° C.

The following two procedures are intended to provide a basis for comparing the powdery, acicular materials described in the first seven examples to metal powders.

Example 10

A first solution is prepared by dissolving 23.8 g. $CoCl_2 \cdot 6H_2O$ in a mixture of 75 ml. denatured ethyl alcohol.

A second solution is prepared by dissolving 13.5 g. of oxalic acid in a mixture of 100 ml. denatured ethyl alcohol and 100 ml. water.

The two solutions are mixed together in a beaker for three minutes using a magnetic stirring bar. The resulting precipitate is recovered by filtration, washed with acetone four times, and air dried at 30° C. The precipitate is characterized by an average particle size of about 0.1 micron and little, if any, acicular shape.

Example 11

The steps of Example 10 are repeated except the solvent for the $CoCl_2 \cdot 6H_2O$ is 100 ml. water and the solvent for the oxalic acid is 150 ml. of water. Moreover, the wash is modified in that the acetone wash is preceded by four water washes.

The resulting particulate product is rather coarse and irregular in particle shape and appears to be characterized by a much broader range of particle size than characterized the products of Examples 1 through 7.

We claim:
1. In a process for making an oxalate of a metal selected from iron, cobalt, or both iron and cobalt, the steps of
   (1) precipitating a fine suspension of a hydroxide or carbonate of said metal in an aqueous medium comprising a water soluble organic compound forming means to reduce the solubility of said oxalate in said medium;
   (2) mixing and vigorously agitating a solution of oxalic acid with said suspension;
   (3) causing the reaction of said acid and said hydroxide or carbonate during said agitation to form an organometallic salt of said metal and said acid; and then recovering and washing the organometallic salt particles.
2. A process as defined in claim 1 wherein said reaction step is terminated when said oxalate is acicular, has a length-to-diameter ratio of at least 2:1 and is from 0.06 to 2 microns in diameter.

References Cited

UNITED STATES PATENTS

| | | | |
|---|---|---|---|
| 3,478,073 | 11/1969 | Rydh | 260—439 R |
| 1,914,557 | 6/1933 | Craver | 260—429 R |
| 2,636,892 | 4/1953 | Mayer | 260—439 R |
| 2,644,828 | 7/1953 | Kruse et al. | 260—439 R |
| 3,317,574 | 5/1967 | Morita et al. | 252—625 I |
| 3,574,683 | 4/1971 | Johnston | 75—5 AA |

OTHER REFERENCES

Douville et al., Bull. Soc. Chim., France, 5th series, vol. 9, No. 34 (1942) pp. 548–552.

Schuele, J. Phys. Chem., vol. 63 (1959), pp. 83–86.

DANIEL E. WYMAN, Primary Examiner

A. P. DEMERS, Assistant Examiner

U.S. Cl. X.R.

148—105; 423—574

UNITED STATES PATENT OFFICE
CERTIFICATE OF CORRECTION

Patent No. 3,803,191  Dated April 9, 1974

Inventor(s) John E. Ehrreich et al.

It is certified that error appears in the above-identified patent and that said Letters Patent are hereby corrected as shown below:

Column 4, line 7, in the table opposite "C" and under "Solvent" "50 ml" should read -- 150 ml --.

Signed and sealed this 10th day of September 1974.

(SEAL)
Attest:

McCOY M. GIBSON, JR.　　　　　　　　　　C. MARSHALL DANN
Attesting Officer　　　　　　　　　　　　Commissioner of Patents